March 26, 1946. H. C. DAVIS 2,397,129
CONVEYER DUMP
Filed Nov. 30, 1943 3 Sheets-Sheet 1

INVENTOR
Hamilton C. Davis
BY Harry C. Schroeder
ATTORNEY

Patented Mar. 26, 1946

2,397,129

UNITED STATES PATENT OFFICE 2,397,129

CONVEYER DUMP

Hamilton C. Davis, Diablo, Calif.

Application November 30, 1943, Serial No. 512,381

1 Claim. (Cl. 214—1.1)

This invention relates to cannery equipment, the principal object being to provide an improved apparatus for carrying out a desired cycle of operations, and particularly to facilitate the handling of boxes of fruits and vegetables as they are received in the cannery from the field, and to convey and discharge the contents of such boxes into the sterilizing vat, with a minimum of manual exertion and loss of time.

With the foregoing and other objects in view, which will appear as the description proceeds, the invention resides in the combination and arrangement of parts and details of construction hereinafter described and claimed, it being understood that changes in the precise embodiment of the invention herein disclosed may be made within the scope of what is claimed, without departing from the spirit of the invention.

Figure 1:
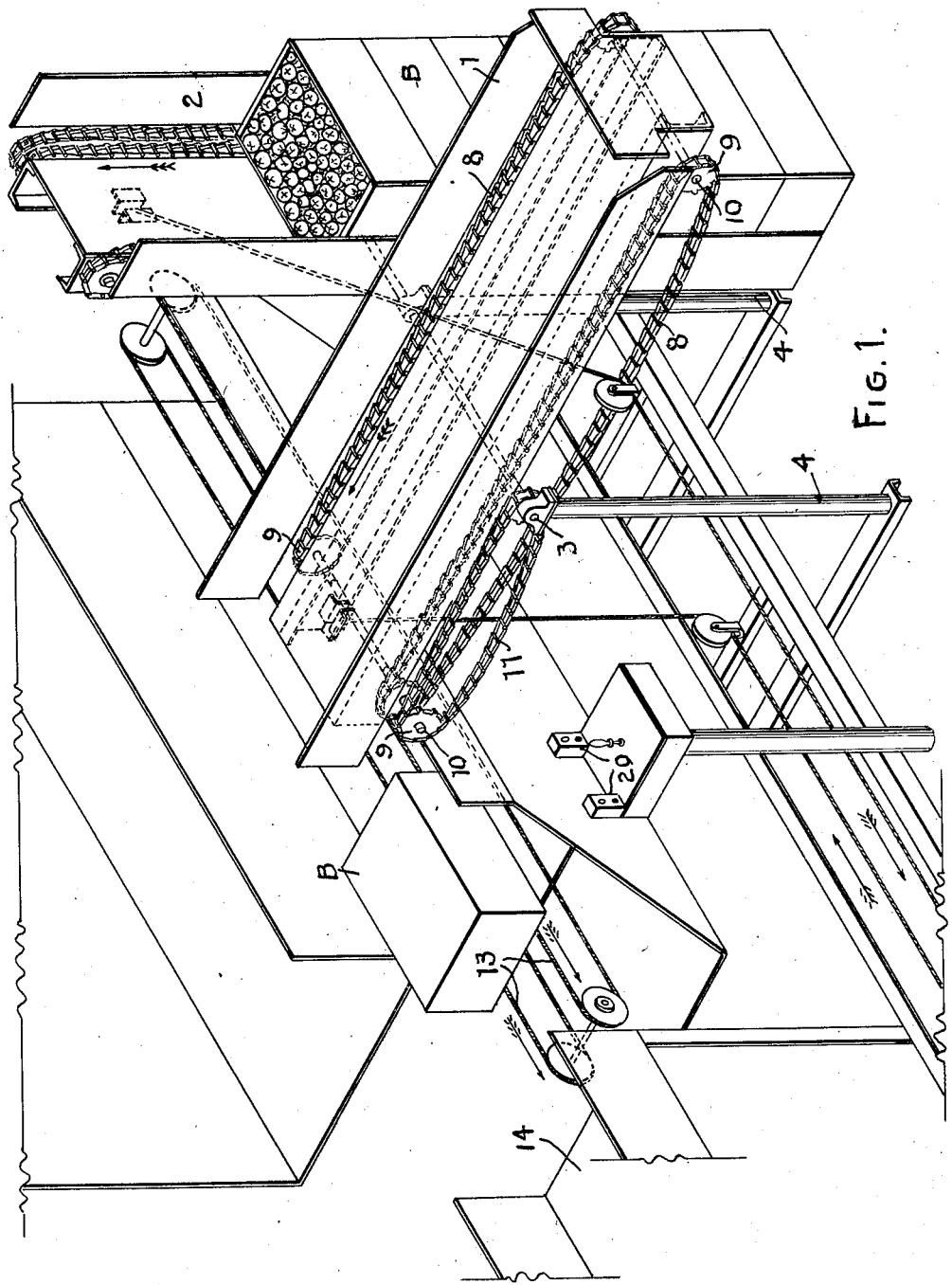
Figure 1 is a perspective view of the apparatus as in operation with one box holder in loading position and the other one in discharge position.
Figure 2:
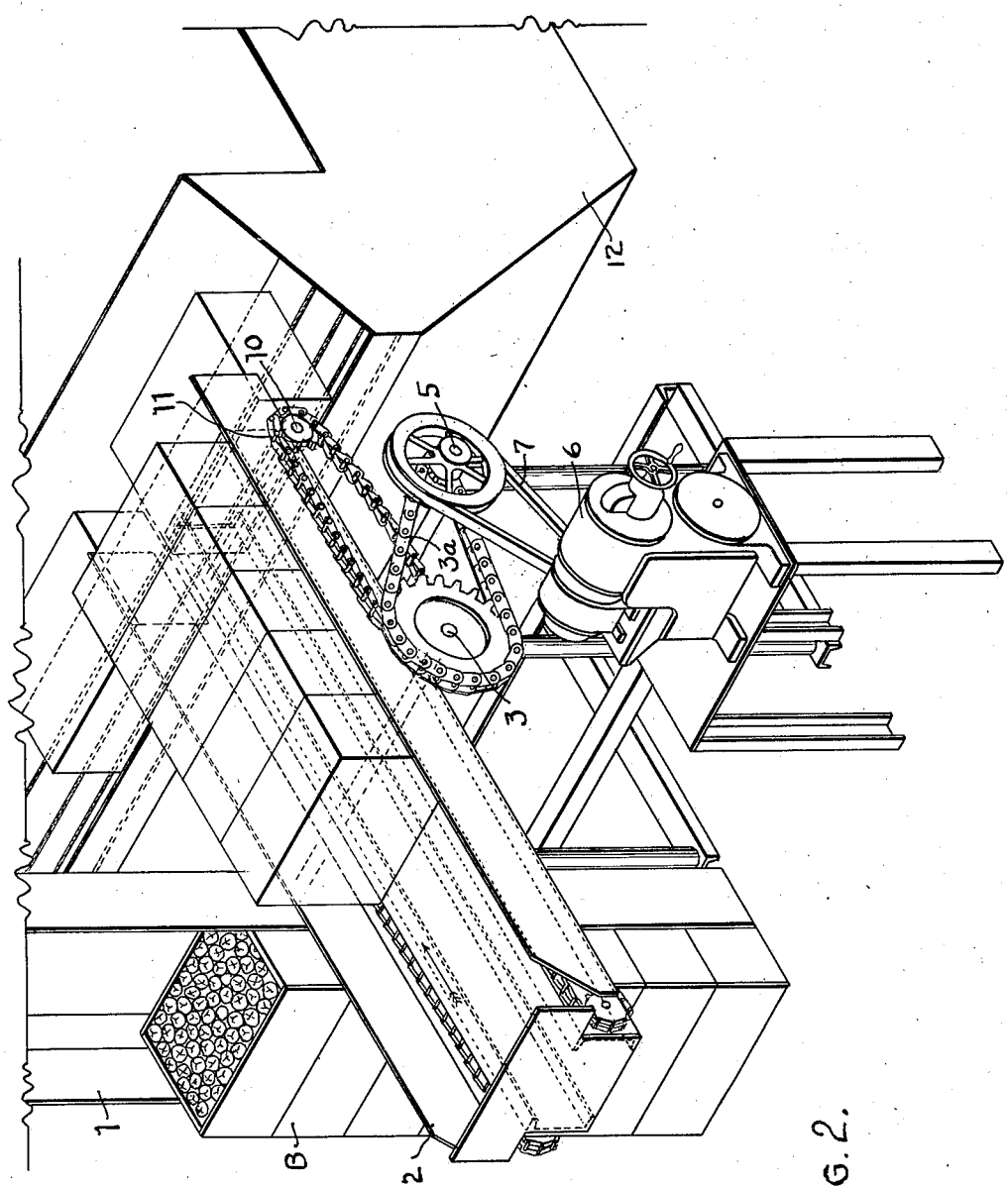
Figure 2 is a fragmentary perspective view of the apparatus, looking from the opposite side to that shown in Figure 1.
Figure 3:
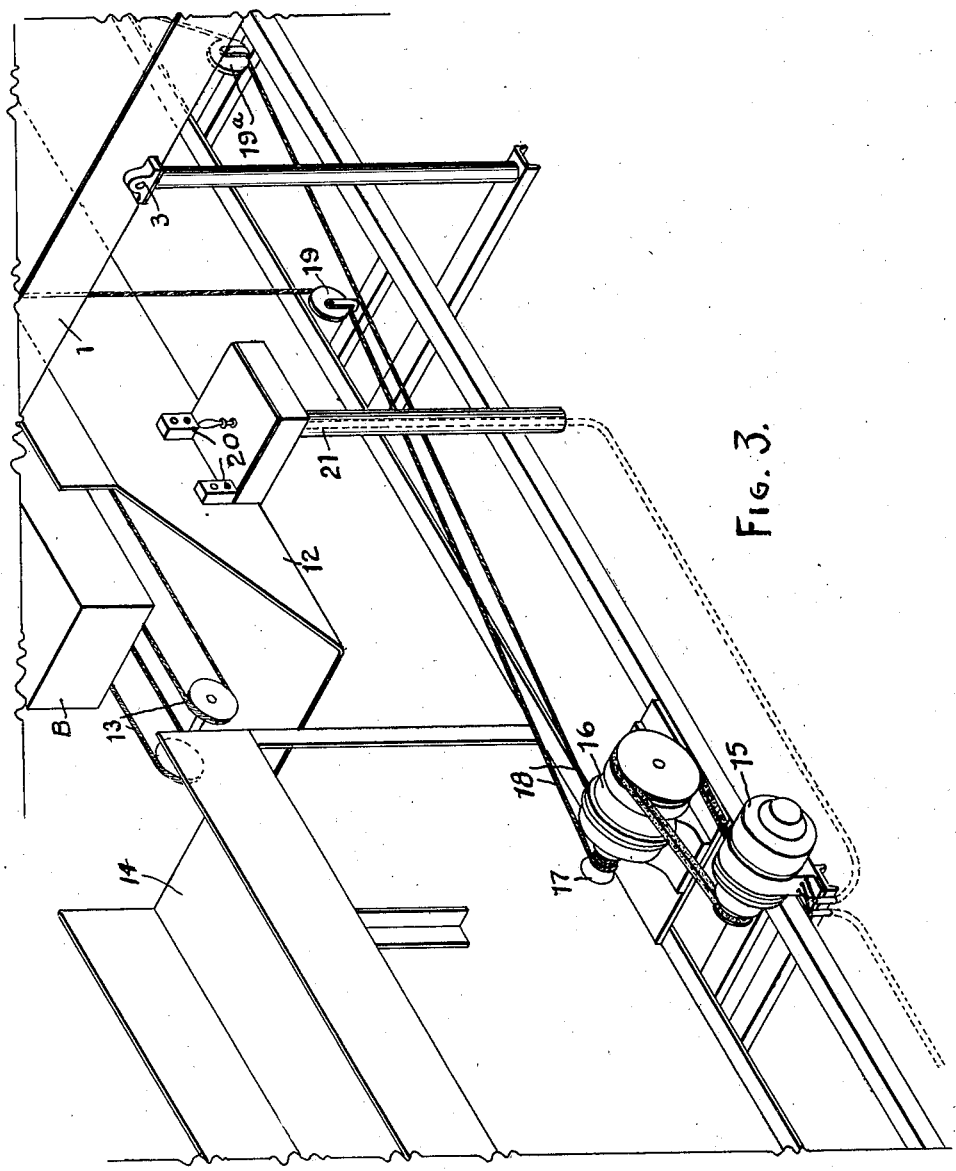
Figure 3 is a fragmentary perspective view showing particularly the operating and control mechanism for alternately raising and lowering the box holders.

Referring to the numerals of reference on the drawings, the apparatus comprises a pair of what I here term box supports or racks 1 and 2 disposed side by side and mounted for independent tilting movement on a common transverse shaft 3 journaled on the upper end of supporting pedestals 4. Each support is a rectangular tray or chute-like member, of a size to support a plurality of fruit boxes in stacked relation along the same, being closed at its outer end only.

The shaft 3 is located at such a point in the length of each holder that the latter is overbalanced toward its outer or closed end and tends to assume a vertical position; the height of the pedestals from the floor being such that the outer end of the holders when thus disposed are adjacent the floor.

A chain drive 3a connects shaft 3 and a countershaft 5 in driving relation; shaft 5 being driven from an electric motor 6 by a chain drive 7 therebetween. A pair of endless chains 8 are mounted on each box support adjacent the sides thereof, with their upper runs projecting slightly above the floor of the support. The chains, for each support are mounted on sprocket wheels 9 at the ends of and under the supports, these wheels being fixed on cross shafts 10. One of the shafts 10 of each box support is connected with the shaft 3 in driving relation by a chain drive 11. The direction of rotation of the shaft 3 is such that the upper runs of chains 8 travel away from the outer end of the box supports, and are continuously in motion while the apparatus is in operation.

As long as a box support or tray is vertically disposed, the boxes of fruit B then stacked thereon as shown in Figure 1, are not moved by the chains 8, which then merely slide past the boxes. When however, the chute is tilted to a horizontal position, the boxes then bear of their full weight on the chains. Said chains thus convey the boxes along the tray to the discharge end thereof, the boxes being then naturally disposed so that their open tops are vertically disposed and face the open discharge end of the chute. Said end of both trays, when in a horizontal position, overhangs a conventional washing vat or tank 12 which of itself forms no part of this invention.

An endless conveyer comprising a pair of ropes 13 spaced apart a distance less than the width of a box B, extends along the vat 12 between the top of said vat and the discharge end of the chutes and beyond the same.

As the filled boxes are propelled over the discharge end of the trays therefore, they tip over onto the rope conveyer, at the same time discharging their contents into the vat. The empty upside-down boxes are moved along and clear of the vat by the rope conveyer, which finally delivers the boxes to a chute 14 leading to suitable sterilizing equipment.

The box supports or trays 1 and 2 are alternately tilted in one direction or the other under the control of the operator by the following means:

A reversible electric motor 15 is mounted adjacent the floor level some distance to one side of the box supports, which drives a reduction gear unit 16. This unit drives a winch drum 17 about which is wrapped a rope or cable 18. One run of the cable extends under a pulley 19 mounted under support 1 adjacent the plane of the discharge end thereof and thence extends upwardly to a connection with the support adjacent said end. The other run of the cable likewise extends under a pulley 19a under support 2 and thence upwardly to a connection with said support adjacent its discharge end.

Since one run of the cable takes off from the top of the drum and the other run from the bottom, one run is pulling while the other is paying out or slack and hence the direction of rotation of the motor depends on which of the box supports is being tilted or raised to a horizontal box-dumping or discharge position. Control of the motor is effected by the operator as necessary by means of the motor control-switches 20 mounted on a conveniently positioned stand 21.

It will thus be seen that the operator from his station can see when one box support has been completely discharged, and if the other support has been fully loaded in the meantime, he controls the reversing in position of the two supports by proper manipulation of the motor switches. Since the cable 18 is wrapped about the drum and hence has only frictional engagement therewith, said cable may slip on the drum in the event that the box supports have reached their limit of movement and the operator has failed to stop the motor.

I claim:

A box handling apparatus of the character described having in combination a horizontally disposed endless conveyer, a pair of tiltable stacking members pivotally supported adjacent said conveyer on an axis parallel with the latter, the pivotal support of the respective stacking members being positioned off-center so as to normally cause each stacking member to assume a vertical position, a driven cable drum, a cable encircling said drum, each end of the cable being connected to the upper end of a stacking member, a reversible power unit for rotating said drum, so that the stacking units may be alternately tilted to horizontal position, and means operable while the stacking units are in tilted position for removing boxes from the respective stacking members and successively depositing them upon said conveyer.

HAMILTON C. DAVIS.